United States Patent [19]
Grandzol et al.

[11] Patent Number: 4,463,131
[45] Date of Patent: Jul. 31, 1984

[54] BULK FLOWABLE IMPACT MODIFIERS

[75] Inventors: Richard J. Grandzol, Doylestown, Pa.; Albert J. McFaull, Sicklerville, N.J.; W. Hunter Wanger, Southampton, Pa.; I. Samuel Rabinovic, La Napouli, France

[73] Assignee: Rohm and Haas Company, Philadelphia, Pa.

[21] Appl. No.: 420,150

[22] Filed: Sep. 20, 1982

Related U.S. Application Data

[63] Continuation of Ser. No. 269,116, Jun. 2, 1981, abandoned.

[51] Int. Cl.$^3$ ............... C08L 51/00; C08L 27/06; C08L 51/06
[52] U.S. Cl. ............... 525/76; 525/84; 525/86; 525/85; 427/222
[58] Field of Search ............ 525/84, 86, 76, 85; 427/222; 428/407, 902

[56] References Cited

U.S. PATENT DOCUMENTS

| | | | |
|---|---|---|---|
| 3,813,259 | 5/1974 | Neubert | 427/222 |
| 4,119,759 | 10/1978 | Fischer | 428/407 |
| 4,265,939 | 5/1981 | Tebben | 427/222 |
| 4,271,213 | 6/1981 | Grimm | 427/222 |
| 4,298,654 | 11/1981 | McCarty | 427/222 |

FOREIGN PATENT DOCUMENTS 639946 4/1962 Canada ................... 526/86

Primary Examiner—Sam Silverberg
Attorney, Agent, or Firm—Jordan J. Driks

[57] ABSTRACT

Disclosed herein are coagulated impact modifier polymers having improved powder flow, bulk density and reduced caking tendency. These compositions are preferably prepared by introducing an emulsion of a hard, non-elastomeric polymer into a slurry of a coagulated impact modifier polymer, then coagulating and drying the resultant blend.

9 Claims, No Drawings

BULK FLOWABLE IMPACT MODIFIERS

This is a continuation of application Ser. No. 269,116 filed June 2, 1981 now abandoned.

BACKGROUND OF THE INVENTION

1. Field of the Invention

This invention relates to improvements in the handleability of impact modifier polymers of the type which are used to modify polyvinyl chloride (PVC) and other polymers.

2. Description of the Prior Art

Graft polymer impact modifiers are generally used in hard polymers such as PVC, styrene resins, styrene acrylonitrile (SAN) and methylmethacrylate (MMA) resins. These graft polymers are typically prepared through emulsion polymerization of butadiene, butadiene and styrene, lower alkyl esters of acrylic acid, isoprene, and the like, to form an elastomeric polymer onto which is grafted a hard polymer, typically one or more of the following: methyl methacrylate, styrene, and acrylonitrile. When the graft polymer impact modifiers are isolated by coagulation with an acid or a salt and then dehydrated and dried to obtain a powder, especially when the impact modifier has high elastomer levels, it often agglomerates during storage and can clog or block transportation lines. This is generally referred to as a flowability problem. One solution to this problem has been proposed in U.K. patent application No. 2,044,779 published Oct. 22, 1980. The U.K. Patent teaches blending 0.1 to 25 parts of a graft polymer comprising 5 to 49% of an elastomeric trunk polymer and 95 to 51% of a branch polymer of a hard resin producing monomer grafted on the elastomeric trunk polymer to improve the powder flow and compaction properties of graft polymer impact modifiers. According to the British patent, Comparison Example 3, it is very important that the additive polymer be a graft containing an elastomeric trunk polymer, because when the hard resin polymer was tried without elastomeric trunk polymer, it caused the impact modifier polymer to possess notably poor ability to impart impact strength to PVC, and the PVC resin compositions obtained therefrom had numerous fish eyes, i.e., the modifier had a dispersability problem in PVC.

SUMMARY OF THE INVENTION

In spite of the fact that the prior art has taught away from non-elastomeric hard polymers as additives to impact modifier polymers to improve the bulk flow and impact properties, there are certain advantages to using readily available hard, non-elastomeric containing polymers for this application. The prior elastomer containing additive polymers are special polymers containing special low rubber levels which must be prepared just for this application, and have several disadvantages arising from the fact that they contain the elastomer.

Therefore, the object of the present invention is to provide an improved bulk flowable impact modifier polymer. It is another object of the present invention to provide impact modifier polymers which have improved compaction and bulk density properties and reduced caking tendencies. A still further object of the invention is to provide a novel process for preparing such improved impact modifier polymers. A still further object is to provide bulk flowable impact modifiers which are free of the disadvantages of the prior art, and yet suffer no diminution of impact efficiency or dispersability.

These objects and others as will become apparent from the following specification, are achieved by the present invention which comprises bulk flowable coagulated impact modifier particles coated or agglomerated with a hard, non-elastomeric high molecular weight polymer. In another aspect, the invention comprises a process comprising introducing an emulsion of a hard, non-elastomeric polymer into a slurry of coagulated impact modifier polymer, then coagulating and drying the resultant blend so as to produce impact modifier particles coated with the hard polymer and having improved powder flow, bulk density, and reduced caking tendency.

DETAILED DESCRIPTION OF THE INVENTION AND THE PREFERRED EMBODIMENTS

The impact modifier polymers which are improved by the present invention are prepared by polymerization of 50 to 90 parts of an elastomeric polymer by emulsion polymerization, and grafting thereto about 10 to 50 parts of a hard resin-producing monomer or mixture of monomers in one or more subsequent stages. In some cases the elastomer stage is not the first stage. These polymers are conventional and well known in the art. The elastomeric polymer is typically prepared from butadiene, isoprene, chloroprene, alkylacrylate having 4 to 10 carbon atoms in the alkyl group, and optional additional monomers copolymerizable therewith, such as styrene, alpha methyl styrene, methyl methacrylate, acrylonitrile, methacrylonitrile and the like. The subsequent stage or stages are prepared from one or more hard resin producing monomers such as methyl methacrylate (MMA), ethyl methacrylate, (EMA) butyl methacrylate, (BMA) acrylonitrile, methacrylonitrile, vinyl chloride, vinyl bromide, styrene, alpha methylstyrene and the like, singly or in mixtures, and in one or more stages. These polymers are typically known as MBS, ABS, ABSN, and AAS resins, for example.

It is well known that the higher the elastomer percentage in such grafted impact modifiers, the greater the impact efficiency will be. However, it is also known that with greater elastomeric contents, powder flow problems and caking problems increase. The present invention allows for more highly efficient impact modifiers, i.e., higher elastomeric contents, and yet permits production of highly bulk flowable modifiers.

Although the impact modifier polymer and the hard polymer can be mixed to get improved bulk flow properties, an especially preferred and advantageous method comprises introducing an emulsion of the hard non-elastomeric polymer to a slurry of coagulated impact modifier polymer. Typically this takes place by adding an emulsion of the hard polymer in the coagulation tank of the impact modifier polymer, and results in the impact modifier particles being coated with the hard polymer. The coagulation and isolation process is then followed as normal with subsequent dehydration to obtain the improved impact modifier polymers of the present invention. Typically and preferably the weight ratio of hard polymer to impact modifier polymers is about 0.1:99.9 to about 10:90, and more preferably about 0.5:99.5 to about 5:95, and most preferably about 1:99 to 3:97. The hard, non-elastomeric polymer has a Tg of greater than 25° C. and is preferably prepared from a monomer system comprised of at least 80% by weight of one or more monomers selected from the group consisting of methyl methacrylate, butyl methacrylate, styrene and alpha methylstyrene. The balance of the monomers in the monomer system can be any other copolymerizable, ethylenically unsaturated monomer, for example "softer" monomers such as acrylates having one to four carbons in the alkyl group. One particularly preferred embodiment for the hard, non-elastomeric polymer is a copolymer of methyl methacrylate and ethyl acrylate in a weight ratio of about 99:1 to about 80:20, having a molecular weight of one million.

The bulk flowable impact modifiers of the invention are used to blend with hard resins such as vinyl chloride homopolymer and copolymer resins, styrene resin and methyl methacrylate resin, in ratios of about 1 to 40 parts of the impact modifier to about 100 parts of the hard resin.

The following examples, in which all parts and percentages are by weight unless otherwise indicated, are presented to illustrate a few embodiments of the invention. It should be clear to those skilled in the art that the invention itself is not limited to these few specific embodiments illustrated herein.

Example 1—Preparation of Impact Modifier

A monomer mixture comprising 0.15 part tertiary butyl hydroperoxide, 65 parts of butadiene mixed with 1.0 parts of divinyl benzene and 18 parts of styrene, 0.001 parts of ferrous sulfate, 0.005 parts of EDTA (disodiumethylenediamine tetra acetate), 0.15 part of formaldehyde sodium sulfoxylate and 135 parts of distilled water mixed with 0.06 parts of sodium chloride, 1.2 parts sodium stearate were charged into an autoclave provided with a stirrer. The resulting mixture was subjected to polymerization at 65° C. for 14 hours.

A monomer mixture comprising 0.15 parts of tertiary butyl hydroperoxide, 14 parts of ethyl methacrylate mixed with 11 parts of styrene and 0.12 parts of formaldehyde sodium sulfoxylate were added to this latex (solid content 75 parts) and the resulting mixture was subjected to polymerization at 60° C. for five hours. An emulsion of 0.2 parts of Topanol CA and 0.6 parts of divinyl thiodipropionate were then added to stabilize and yield a latex of graft copolymers (solids content 100 parts).

Example 2—Preparation of Non-Elastomeric, Hard Copolymers

A monomer mixture comprising 0.1 parts of hydrogen peroxide, 90 parts of MMA mixed with 10 parts of EA, 0.2 parts of formaldehyde sodium sulfoxylate of formaldahide sodium sulfoxylate and 233 parts of distilled water mixed with 0.04 parts of sodium chloride, 1.0 parts of sodium lauryl sulfate were charged into a reaction vessel provided with a stirrer. The resulting mixture was subjected to polymerization initiated at 25°–30° C. and continued for four hours to yield a latex of non-elastomeric copolymer (solids content 100 parts).

Example 3—Blending of Impact Modifier Polymer and Hard Polymer 100 parts of the impact modifier latex graft copolymer (solid content: 40 parts) of Example 1 was added to 300 parts of a 0.25% acetic acid and 0.3% sodium chloride solution at 35° C. Thereafter the slurry was heated to 75° C. Thereafter the hard copolymer latex for was added to the coagulated slurry. The slurry was cooled and the pH was adjusted with phosphoric acid to 2.75. The resultant slurry was dewatered and dried.

Example 4—Coagulation of the Impact Modifier Copolymer

Without Addition of Hard Polymer (Comparative)

100 parts of the impact modifier latex (solids content: 40 parts) of Example 1 was added to 300 parts of a 0.25% acetic acid and 0.3% sodium chloride solution at 35° C. Thereafter the slurry was heated to 75° C. to complete the coagulation process. The slurry was cooled an the pH was adjusted with phosphoric acid to 2.75. The resultant slurry was dewatered and dried.

Example 5—Testing for Powder Flow and Impact Strength

The modifiers of Example 3 and Comparative Example 4 were examined for powder flow, bulk density, and compaction properties and were also incorporated in standard PVC formulations and tested for impact strength. The results are reported in the following table.

With respect to Example 3, and Comparative Example 4, the Table shows the improvement of powder flow density and compaction properties with the presence of the hard copolymer. The Table also shows that no reduction in impact strength corresponded to the presence of the hard copolymer.

TABLE

| | Example 3 | Comparative Example 4 |
|---|---|---|
| Composition of Impact Modifier and Hard Polymer Blend | | |
| (1) Graft Copolymer/Hard Resin | 75/25 | 75/25 |
| (2) Hard Polymer Of Example 2 Quantity Added (Solids basis) | 3 | — |
| Powder Properties | | |
| (1) Flow Rate (Seconds/50 g) ASTM D-1895-69 | 5 | 11 |
| (2) Bulk Density (packed g/cc) | 0.45 | 0.32 |
| (3) Compaction (% caked after pressing/screening) | 0 | 20 |
| Properties of PVC Compound | | |
| (1) PVC Formulation/Impact Modifier | 100/13 | 100/13 |
| (2) Impact, Notched Izod (23° C.) ft./lbs. | 16.2 ± 0.3 | 15.2 ± 1.2 |
| (3) Percent Ductile Breaks | 100 | 100 |

What is claimed:

1. A resin composition comprising a resin selected from the class consisting of poly(vinyl chloride) and copolymers thereof, polystyrene and poly (methyl methacrylate) and, blended with said resin, from about 1 to about 40 parts, by weight, for each 100 parts of said resin of an impact modifier composition prepared by:
   (a) introducing an emulsion of a hard, non-elastomeric containing polymer into a slurry of coagulated impact modifier polymer, coagulating and drying the resultant blend so as to produce impact modifier particles coated with said hard polymer and having improved powder flow, bulk density, and reduced caking tendency, the weight ratio of said hard polymer to impact modifier polymer being from about 0.1:99.9 to about 10:90, said impact modifier polymer being a grafted multistage copolymer having a first, elastomeric stage or trunk polymer and one or more subsequent harder stages or branch polymers, said elastomeric component comprising about 50% to about 90% by weight of the graft copolymer.

2. A composition according to claim 1 wherein the hard, non-elastomeric polymer has a Tg of greater than 25° C. and is from a monomer system comprised of at least 80% by weight of one or more monomers selected from the group consisting of methyl methacrylate, styrene, alpha methyl styrene and butyl methacrylate.

3. A composition according to claim 1 wherein said hard, non-elastomeric polymer is a copolymer of methyl methacrylate and ethyl acrylate in a weight ratio of about 99:1 to about 80:20.

4. A composition according to claim 1 wherein the coagulated impact modifier particles have an average diameter of from about 800 Å to about 2500 Å.

5. A composition according to claim 1 wherein said elastomeric stage or trunk polymer is a polymer of one or more monomers selected from the group consisting of butadiene, isoprene, chloroprene, and alkyl acrylates having 4 to 10 carbon atoms.

6. A composition according to claim 1 wherein one or more of said hard polymer is a polymer or copolymer of a major part of one or more monomers selected from the class consisting of methyl methacrylate, ethyl methacrylate, butyl methacrylate, alphamethyl styrene, acrylonitrile, methacrylonitrile, vinyl chloride, and vinyl bromide.

7. A composition according to claim 1 wherein said resin is poly(vinyl chloride) and copolymers thereof.

8. A composition according to claim 1 wherein said resin contains polystyrene.

9. A composition according to claim 1 wherein said resin contains poly(methyl methacrylate).

* * * * *